2,964,386
PREPARATION OF TITANIUM DIOXIDE

Arthur Wallace Evans, Nunthorpe, Middlesbrough, William Hughes, Stockton-on-Tees, and James Dennis Groves, Redcar, England, assignors to British Titan Products Company Limited, Billingham, England, a corporation of Great Britain No Drawing. Filed Mar. 14, 1958, Ser. No. 721,370

Claims priority, application Great Britain Mar. 6, 1958

4 Claims. (Cl. 23—202)

This invention is directed to the production of titanium dioxide by reaction of elemental oxygen with any member of a group consisting of titanium tetrachloride, titanium tetrabromide and titanium tetraiodide which will subsequently be referred to in connection with one embodiment, titanium tetrachloride. In the practice of this process, crystalline titanium dioxide tends to deposit upon walls of the jets or inlets through which titanium tetrachloride is introduced into the reaction zone. This is so serious that flow through the jets is interfered with or is even prevented.

In accordance with this invention, such crystal formation may be minimized by introducing oxygen and the titanium chloride vapor into a bed of fluidized solids at a rate fast enough to ensure occurrence of at least a portion of the reaction of the oxygen and the tetrachloride above the level of the bed. By this means, titanium dioxide is formed above the level of the bed and is carried away with the reaction gases. Moreover, crystal formation, if any, which takes place is deposited largely upon the solids in the bed rather than upon the walls of the reactor. Such solids may be removed from the bed continuously or periodically, and plugging of the system is avoided.

In the usual practice of the process, a substantial portion of the reaction also is allowed to take place in the fluidized bed. Thus, the temperature of the bed is maintained above 700° C., preferably 800° C. to 1000° C., rarely above 1250° C. In consequence, titanium dioxide is formed in the bed upon introduction of titanium tetrachloride and oxygen therein, substantially as described in copending application Serial No. 447,648, filed August 3, 1954, by Arthur Wallace Evans et al., now U.S. Patent No. 2,828,187, patented March 25, 1958.

By introducing the reactants titanium tetrachloride and oxygen into the bed faster than the reaction takes place in the bed, some of the reaction is caused to take place above the bed, i.e., in the vapor space existing above the surface of the bed. This is manifested by the existence of a temperature above the bed higher than that existing in the bed itself.

The material comprising the fluid bed usually is of a particle size of about 40 to 1000 microns, being in a form which will fluidize in a stream of titanium tetrachloride and oxygen and yet allow the evolved $TiO_2$ to be carried away from the bed by the gases leaving the bed.

The material of the bed should be chemically inert to the reaction gases and resistant to abrasion or breakage. Suitable materials are minerals such as silica, alumina, zircon or titanium dioxide (rutile). The bed is fluidized by the gaseous reactants which flow through the bed rapidly enough to provide a reacting mixture of titanium tetrachloride and oxygen above the level of the bed.

The reaction chamber in which the oxidation takes place consists essentially of a shaft furnace having as base a perforated plate optionally having porous diaphragms or other suitable device above the perforations to allow the passage of gas upward but to prevent the passage of solid through the plate. Above the plate is a bed of the sand-type material selected to constitute the fluidized bed and, into this bed, preferably through the perforated plate, air or oxygen or oxygen-containing gases are fed so as to maintain the bed in a fluidized condition. Meanwhile, admixed with the oxygen-containing gases or fed through a separate port through part of the perforated plate or by part admission above the bed or from the top or side of the chamber to just above the base of the bed through a tube jet, the titanium tetrachloride vapor or liquid to be oxidized may be injected.

The method is particularly applicable to the production of titanium oxide, either in the form of anatase or in the form of rutile, by the reaction of titanium chloride vapor with oxygen, the sand serving in its fluidized condition to function as a gas mixing device for the dispersion of the reacting gases, and, at the same time, for the maintenance of the product in a dispersed state so that it may be conveyed from the furnace suspended in the gases discharged therefrom.

The chamber above the perforated plate, both in the fluid bed zone and above, may be externally heated or may be in the form of a well insulated shaft furnace to which external auxiliary heat may be supplied if necessary. Located near the top of this chamber is a port for the discharge of the gases from the reaction containing the product titanium oxide in suspension. These gases are led to cyclones or other well-known suitable apparatus for separating the suspended titanium oxide from the gases, which latter are then treated for recovery of chlorine by well-known means prior to discharge to atmosphere or, alternatively, the chlorine-containing gases may be used in the chlorination of titanium bearing ores or other suitable purposes wherein chlorine purification may not be necessary. The chamber and ancillary equipment, including perforated plate, ports, and ductings, are constructed in well-known refractory materials resistant to chlorine at the reaction temperature.

Enough of the sand or like material is provided to form a fluidized bed of ½ to 3 feet depth. The gases fed through the perforated plate may consist of oxygen or oxygen-containing gases, such as air, which may be fed through part or all of the plate area. In the former case, the other part will feed titanium tetrachloride vapor separately introduced so that the titanium tetrachloride vapor and oxygen-containing gases contact and are distributed and react within the fluid bed.

As a further alternative, the titanium tetrachloride and oxygen gases may be pre-mixed at temperatures below 500° C. and the mixture fed through the perforated plate. As a still further alternative, the oxygen-containing gases may be fed through the perforated plate, and at least a part of the titanium tetrachloride may be injected into the reaction chamber either by dropping liquid titanium tetrachloride onto the bed, but preferably within the bed (i.e., just above the perforated plate), or it may be injected in gaseous form into the bed, preferably through the side by means of a tube the exit of which is located within the bed and just above the perforated plate. The temperature at which titanium tetrachloride is admitted may determine the optimum conditions required.

The reaction between the titantium tetrachloride and oxygen is exothermic and, with a well-insulated furnace, the heat generated by the reaction may suffice. However, it may be desirable to admit other fuel gases as, for instance, carbon monoxide either admixed with titanium tetrachloride or separately admitted in one of the alternative methods given above, such as the separate addition below the plate, or by separate addition through a suitable port of entry the exit of which is within the bed and preferably close to the perforated plate. By this means, auxiliary heat is supplied by the reaction of carbon monoxide or other fuel with the oxygen constituent to attain the temperature required for the reaction of the titanium chloride with oxygen.

The construction of the perforated plate used in this invention may follow any well-known pattern normally suitable for admitting gases upward into a fluid bed. A preferred form is that in which the pressure drop across the plate approximates the pressure drop through the bed. In this design, controlled orifices are inserted into the perforations, preferably on the under side of the plate, and a disc or gas permeable diaphragm may be inserted, preferably at the top of each perforation, so as to allow upward flow of the gas but prevent the return flow of dust or other undesirable solid material from entering either the perforation or the gas chamber below the plate. The provision of this type of construction in the perforated plate enables additionally a uniform gas distribution by use of the orifices which, because of their position, are unlikely to become over-heated or obstructed, and may furthermore be easily detached for examination without removal of the plate. Also, as indicated above, the perforated plate may be partitioned on the under side so that gases, such as oxygen gases or vapor of titanium tetrachloride, carbon monoxide or other fuel gases, may be separately admitted in the bed and, by virtue of the partitioning, the various gas inlets may be so distributed that, on entering the bed above, speedy and intimate admixture is assured.

For the conduct of the invention, the range of temperature above the bed is 700 to 1200° C. and the preferred range is 800 to 950° C., and this temperature may be initiated by prior burning of the carbon monoxide or other fuel gas with oxygen before the titanium tetrachloride is introduced.

The molar ratio of titanium tetrachloride to oxygen may range from 1:02 to 1:3; if auxiliary heating is employed, the carbon monoxide and additional oxygen which will be introduced in the molar ratio $2CO:O_2$ and, if necessary, the oxygen required to react with the carbon monoxide may be admitted in proximity to the carbon monoxide, but preferably within the bed. It may be desirable that one or both of the reactants may be preheated before admission. The proportion of oxygen and the oxygen-containing gases relative to the titanium tetrachloride is selected primarily to yield the product most suitable, but, wherever possible, the nearer the proportion of oxygen to titanium tetrachloride is to 1:1, the stronger will be the concentration of chlorine generated and the greater the economy in recovery of chlorine, i.e., the more suitable will the gas mixture be for re-use in chlorination operations without special techniques for chlorine separation.

In the production of titanium oxide in the rutile form, the conditions will be similar to the above; the temperature will vary from 700° C. to 1200° C. (preferably 800 to 1100° C.) depending on the time of contact.

Following is a description by way of example of a method of carrying the invention into effect.

*Example*

The reaction vessel is a mild steel shell 4 feet 2 inches in diameter, lined with 4½ inch insulating brick and providing a vertical shaft reaction chamber 18 inches in diameter. Vaporized titanium tetrachloride and oxygen were supplied through a plurality of separate inlets extending through a plate of the type described above and having orifices in each of the inlets. $TiCl_4$ vapor is fed through four central inlets from a common manifold, and oxygen through eight inlets on both sides of the $TiCl_4$ ports.

Zircon sand used in the bed had a particle size of 60 to 170 mesh B.S.S., the predominant amount being 100 to 150 mesh B.S.S. $TiCl_4$ was introduced at a rate of 6.5 pounds per hour and pure oxygen at the rate of 19.5 cubic feet per minute measured at one atmosphere pressure and a temperature of 70° C. The bed was heated to 970° C. before beginning to introduce the reactants. After introduction of the reactants commenced, the temperature of the bed gradually fell from 961° C. to 930° C. The temperature above the bed was established at 985° C. to 995° C. This high temperature indicated that reaction took place above the top of the bed. The depth of the bed remained at 1.4 to 2.1 feet. Pigmentary titanium dioxide was formed and collected from the reaction gases removed from the top of the furnace.

In the above example the temperature of the bed gradually fell at the rate of 0.2° C. per minute. Ultimately it would have been necessary to reheat the bed to 950–1000° C. in order to maintain the temperature. By increase in diameter of the reactor and ensuring that a sufficient proportion of the reaction is maintained in the bed, this temperature fall may be avoided and the temperature of the bed may be maintained at the desired level 850–1000° C. for an indefinite period.

The passage of the reactants through the fluid bed faster than they are reacted offers certain advantages. In the first place, no entrapment in the bed of $TiO_2$ produced above the bed can take place. Thus, when the reaction takes place in the bed, some $TiO_2$ evolved is retained in the bed and gradually grows to a size where it is not commercially satisfactory. This retention can be minimized by conducting at least part of the reaction above the bed.

Moreover, the bed itself retains sufficient heat to mix the oxygen and titanium tetrachloride and to ignite the mixture so that the portion of the mixture leaving the bed is heated to reaction temperature and caused to react to produce titanium dioxide. At the same time, burner growth which hampers many processes is not encountered.

Titanium dioxide prepared as herein described may be used to produce refractory materials as well as for pigmentary purposes.

While the process has been described with reference to titanium tetrachloride, it will be apparent that the invention also applies to the vapour phase oxidation of titanium tetrabromide and titanium tetraiodide.

Although the present invention has been described with reference to the specific details of certain embodiments thereof, it is not intended that such details shall be regarded as limitations upon the scope of the invention except insofar as included in the accompanying claims.

What is claimed:

1. In a method of preparing titanium dioxide by reaction of titanium tetrachloride with oxygen in a vapor space at a temperature high enough to cause oxygen to react with titanium tetrachloride to form titanium dioxide, the improvement which comprises establishing a fluidized bed of inert particles below the vapor space, and projecting oxygen and titanium tetrachloride upwardly through the bed and into said vapor space whereby to cause reaction between titanium tetrachloride and oxygen in said vapor space.

2. In a method of preparing titanium dioxide by reaction of titanium tetrachloride with oxygen in an oxygen containing vapor space at a temperature high enough to cause titanium tetrachloride to react with oxygen to form titanium dioxide, the improvement which comprises establishing a fluidized bed of inert particles below the vapor space, and projecting a stream comprising titanium tetrachloride upwardly through the bed and into said vapor space, whereby to cause reaction between titanium tetrachloride and oxygen in said vapor space.

3. In a method of preparing titanium dioxide by reaction of titanium tetrahalide with oxygen in a vapor space at a temperature high enough to cause oxygen to react with titanium tetrahalide to form titanium dioxide, the improvement which comprises establishing a fluidized bed of inert particles below the vapor space, and projecting the oxygen and titanium tetrahalide through the bed and into said vapor space whereby to cause reaction between titanium tetrachloride and oxygen in said vapor space.

4. In a method of preparing titanium dioxide by reaction of titanium tetrachloride with oxygen in a vapor space at a temperature high enough to cause oxygen to react with titanium tetrachloride to form titanium dioxide, the improvement which comprises establishing a fluidized bed of inert particles below the vapor space, and projecting oxygen and titanium tetrachloride upwardly through the bed and into said vapor space at such a high velocity as to effect passage of unreacted oxygen and titanium tetrachloride from the top of the bed into said vapor space whereby to cause reaction between titanium tetrachloride and oxygen in said vapor space, the temperature in said vapor space being maintained by the reaction therein higher than the temperature of said bed.

References Cited in the file of this patent

UNITED STATES PATENTS

| | | |
|---|---|---|
| 2,760,846 | Richmond et al. | Aug. 28, 1956 |
| 2,828,187 | Evans et al. | Mar. 25, 1958 |